Oct. 1, 1935.  W. SCHROEDER  2,015,911
GASOLINE TRACTOR
Filed Oct. 1, 1934   3 Sheets-Sheet 3
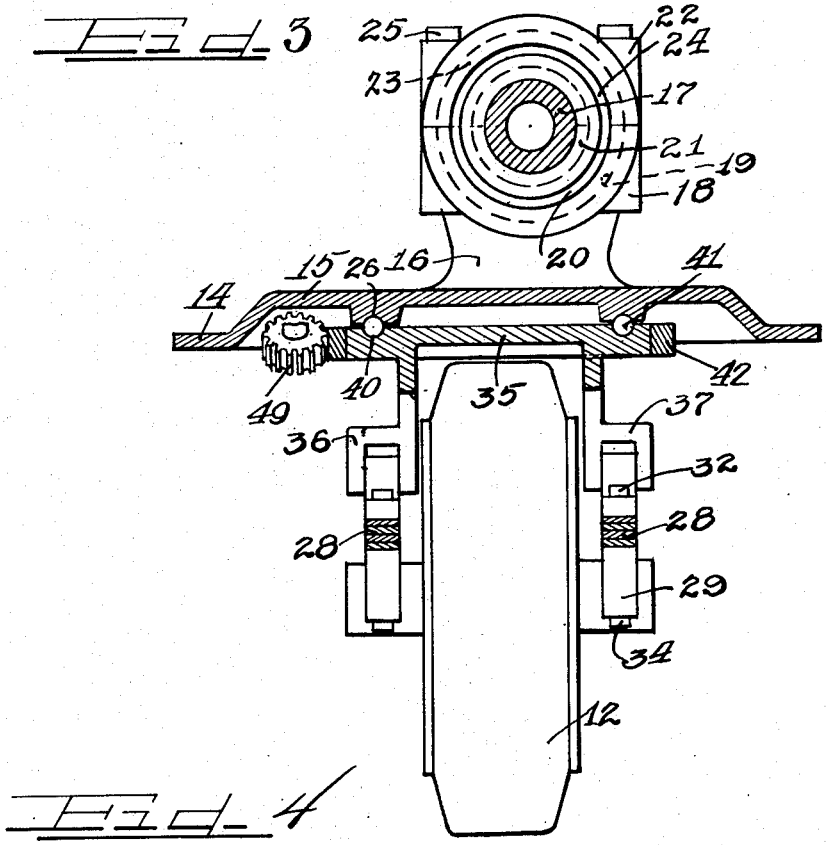
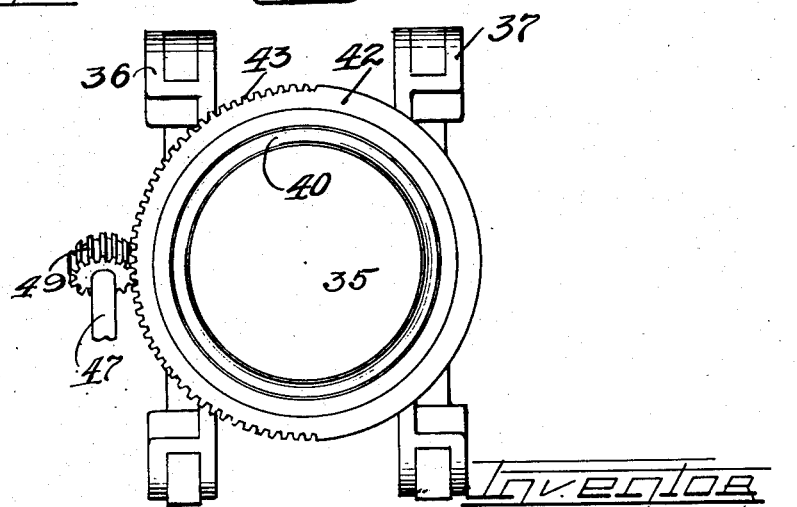
Inventor
William Schroeder Patented Oct. 1, 1935

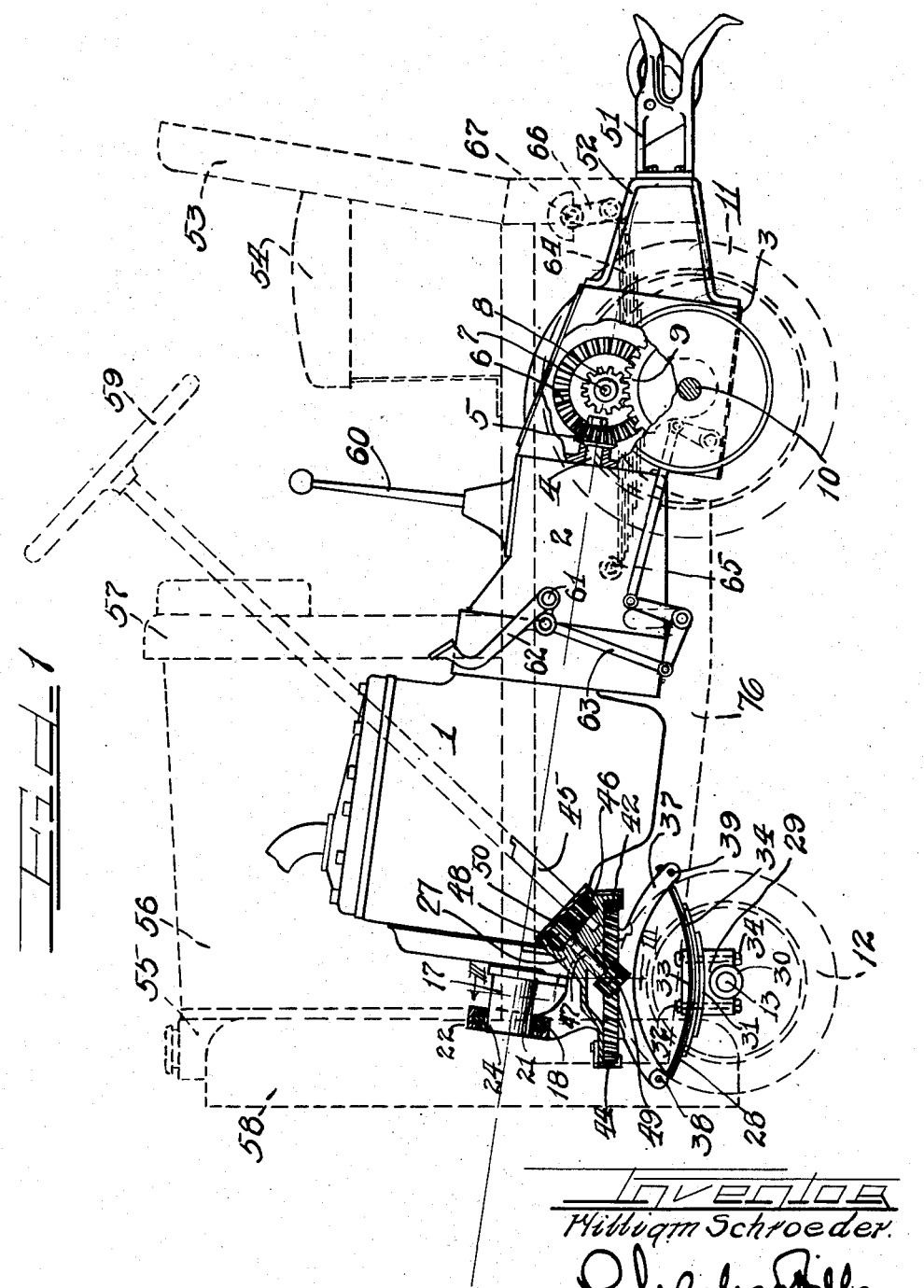

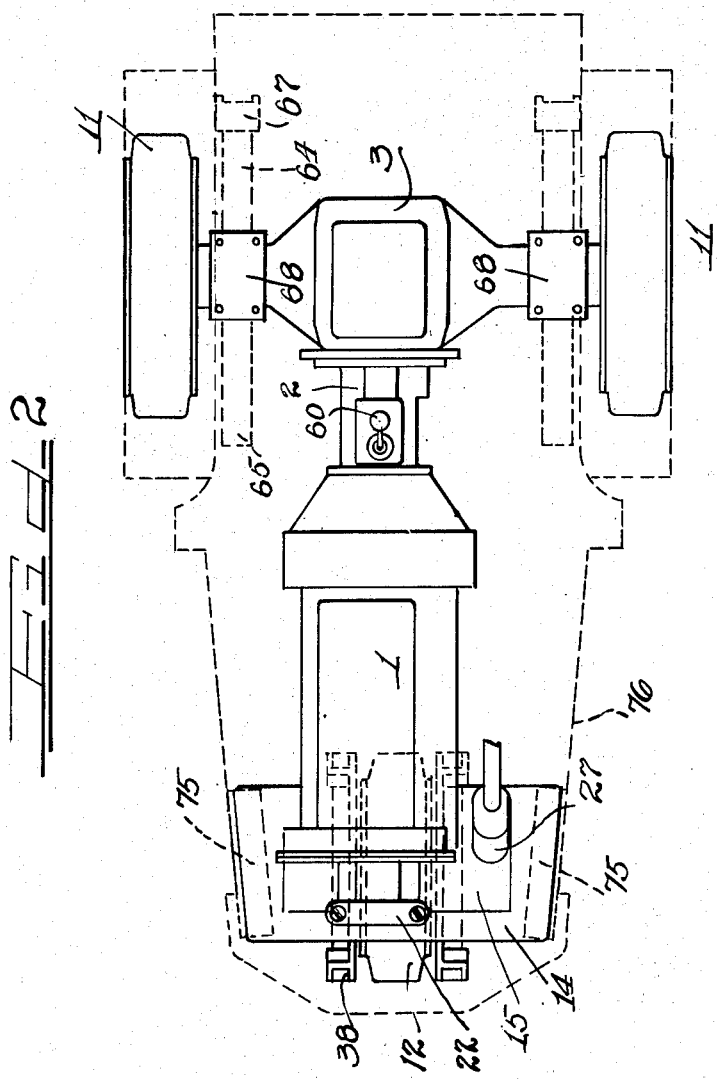

2,015,911

UNITED STATES PATENT OFFICE 2,015,911

GASOLINE TRACTOR

William Schroeder, Chicago, Ill., assignor to Mercury Manufacturing Company, Chicago, Ill., a corporation of Illinois Application October 1, 1934, Serial No. 746,354

REISSUED

3 Claims. (Cl. 180—27)

The present invention relates to a gasoline tractor for hauling "trackless trains", so-called, in and about industrial plants, freight houses, piers, steel mills, lumber yards, packing houses, and the like, and more particularly has to do with a construction of engine transmission and rear axle assembly in a single unit, whereby the propeller shaft and universal joints usually employed are eliminated, thereby providing the simplest and shortest design of tractor.

The invention also contemplates a novel steering mechanism for such tractor whereby the turning radius may be shortened and whereby the kingpin may be eliminated.

Tractors, employed for hauling so-called "trackless trains" in and about freight yards, lumber yards, and similar places, must be so constructed as to have a very short turning radius in order to be maneuvered in close quarters, and also must be constructed with sufficient power to haul loads of considerable weight.

It is an object of the present invention to so construct a tractor as to have minimum overall length or wheel base.

Another object of the invention is to construct a tractor which is built for arduous duty and which is compact and sturdy and capable of easy operation and of turning in short radii.

Another object of the invention is to construct a tractor with the engine, transmission and rear axle assembly constructed as a unit which unit comprises the back bone of the vehicle which supports and carries the load.

A further object of the invention is to provide a three wheeled tractor having a unit construction of the engine, transmission and rear axle assembly as a back bone, and which back bone has two points of suspension at its rear end and one point of suspension at its front end.

A still further object of the invention is to provide a front end mounting for an internal combustion engine whereby oscillatory and vertical movement of the engine with respect to its mounting is possible.

A still further object of the invention is to provide a front end mounting for an internal combustion engine whereby vibratory motion of the engine with respect to its mounting may occur in more than one direction.

Another and yet further object of the present invention is to provide a novel steering mechanism for three wheeled tractors.

It is a further object of the present invention to provide a novel steering mechanism for a tractor having a single steering wheel.

Another and yet further object of the present invention is to provide a tractor having a short turning radius to enable ease of operation in cramped quarters.

Another and still further object of the present invention is to provide a tractor in which are combined the essentials of compactness, ample power and speed, and overall economy of operation.

Generally speaking the back bone construction of the present invention consists of a unit comprising the engine, transmission and rear axle assembly all rigidly secured together, with the rear end of the unit supported on two rear driving wheels and the front end supported on a single steering wheel, the unit having a three point suspension with respect to the wheels.

The invention furthermore contemplates the provision of a novel steering mechanism for a single steering wheel, wherein a short turning radius may be achieved and wherein a kingbolt is eliminated and also wherein the parts are of simple construction so as to be readily prepared and kept in operable condition.

The above other and further objects of the present invention will be apparent from the following description, accompanying drawings, and appended claims.

The accompanying drawings illustrate somewhat diagrammatically, a tractor constructed in accordance with the principles of the present invention and the views thereof are as follows:

Figure 1 is a side elevational view of a three wheeled tractor showing, in full lines, in elevation the backbone or unit construction of the tractor, and in section, details of part of the steering mechanism, and with a part of the rear axle assembly broken away to show straight line drive of the tractor. The dotted lines illustrate a frame which is attached to the backbone for carrying the seat, radiator, hood and instrument board.

Figure 2 is a top plan view showing in full lines plan of the unit backbone of Figure 1, and in dotted line the outline of the frame and relationship of the springs to the rear wheels.

Figure 3 is an enlarged vertical sectional view taken substantially in the plane of the line III—III of Figure 1.

Figure 4 is a top plan view of a plate type steering yoke utilized for carrying the front steering wheel of the tractor of the present invention.

The drawings will now be explained.

The backbone of the tractor of the present invention is a unit construction comprising an internal combustion engine 1, transmission 2, and rear axle assembly designated generally at 3.

These several elements are secured together rigidly and as so secured are adapted for straight lined rive, thus eliminating the usual propeller shaft and universal joints.

Inasmuch as these various elements are of any known form, as far as the engine element and transmission element are concerned, these will not be described.

The rear axle assembly will be hereinafter more fully described.

The rear axle assembly is of double reduction, bevel and spur gear design provided throughout with ball bearings.

The drive shaft 4 from the transmission 2 carries at its end a bevel pinion 5 in mesh with a large bevel gear 6 keyed to a shaft 7, suitably supported in the rear axle assembly. On the shaft 7 is a pinion 8 which meshes with a large pinion 9, which in turn is suitably secured to the drive axles 10 for driving the rear wheels 11. The parts are so arranged that the axis of the shaft 4 is in alignment with the crank-shaft of the engine 1 and the axis of the cross shaft 7 is in the crankshaft centerline. The shaft 4 is usually termed the transmission main shaft.

The backbone unit is mounted in the tractor in inclined position with the front end of the engine higher than the rear end of the unit. The unit is supported at its rear end by the two drive wheels 11.

The tractor is supported at its front end and steered by a single wheel 12 carried on a shaft 13. The front steering mechanism consists of a single spring suspended front wheel with a steering yoke of plate type construction. A member 14, consisting of a plate structure having its central portion offset as at 15 is secured across the front of the tractor with its ends fastened to angle brackets 75 welded to the side panels 76 of the frame.

The member 14 is provided with an upstanding part 16 integrally cast or formed with the member 14, which upstanding part serves as one member of a securing bracket adapted to fasten the steering wheel to the backbone of the tractor.

Suitably secured to the front end of the engine 1 is a shell like stud 17, in axial alignment with the crankshaft of the engine. The upstanding part 16 is provided with a semi-circular pocket 18 which is circumferentially grooved to form a recess 19 for the reception of a semi-circular filler block of resilient material such as rubber 20. A collar 21 which is provided with a circumferential flange in its outer periphery to receive the rubber block 20 is applied over the stud 17 which stud, therefore, rests within the collar and is supported on the resilient filler block 20. A cap 22, semi-circular in elevation and provided with a circumferential recess or pocket 23 on its inner face is applied over the upper semi-circular rubber block 24 to thus complete the clamp for the front end of the unit. A collar is secured in the part 18 by means of bolts 25. The mounting of the front end of the unit as just described, serves as a single point suspension for the front end of the unit, and at the same time permits relative vibration between the front end of the unit and its clamp in a plurality of directions. The stud 17 may oscillate within the collar 21 and the stud and collar may vibrate vertically or otherwise within the clamp, by reason of the provision of the resilient blocks 20 and 24.

The under side of the offset portion 15 of the member 14 is provided with a circular ballrace 26. Integrally formed with the member 14 is a casing 27 adapted to receive pinions which constitute a part of the steering mechanism for the wheel 12.

The wheel 12 is mounted on an axle 13 which is connected to semi-elliptical spring means shown in the present instance as consisting of two springs in side by side and laterally spaced relation, as at 28, by means of blocks 29 each carrying a sleeve 30 for surrounding the shaft 13 and each provided with a curved seat 31 for bearing against the under side of a spring. The springs are clamped against the block 29 by bolts 32 passing through filler block 33 disposed atop the springs which bolts are secured in the block 29 by nuts 34 engaging the lower end of the same.

A steering fork of plate type construction is herein illustrated as consisting of a plate or fifth wheel 35 having integrally formed therewith yokes 36 and 37. An end of each of the springs 28 is secured to an end of a yoke, as by means of a shackle pin 38 while the opposite ends of the springs ride on pin 39 at the opposite ends of the yokes. Thus relative movement of the springs with respect to the yokes is permitted as the unattached ends ride on the pin 39 during such movement.

The upper surface of the plate 35 is provided with a ballrace 40 which, when the parts are assembled, is in register with the race 26 of the member 14. Interposed in the races 26 and 40 are a plurality of bearing balls 41.

Surrounding the fifth wheel 35 and shrunk thereon is a ring gear 42 having teeth 43 on the outside of its periphery.

The fifth wheel 35 is secured to the member 14 in operative relation by clips 44 which are bolted to the front and rear margins of the member 14 and underlie the margin of the fifth wheel 35 and gear 42. In this manner, the fifth wheel is connected to the member 14 for rotative movement with respect thereto, without the use of a kingbolt or similar means.

In order to turn the wheel 12 about its vertical axis for steering purposes, a steering shaft 45 is arranged to extend along one side of the engine 1 illustrated herein as the left side, which shaft enters the box or casing 27 of the member 14 and has keyed to it within said box a steering pinion 46. Supported within this box is a short shaft 47, parallel to the direction of inclination of the shaft 45 and at its upper end carrying a pinion 48 in mesh with the pinion 46 on the shaft 45. At its lower end the shaft 47 carries a pinion 49 in mesh with the teeth 43 of the ring gear 42. From an inspection of Figure 1 of the drawings, it will be observed that the teeth 43 are inclined in the direction of inclination of the shaft 47 so that the pinion 49 may mesh with the teeth in proper relation. The pinions 46 and 48 are retained in the box or casing 27 by means of a cover plate 50 suitably secured in position.

The pinions just described constitute a double reduction gear between the steering shaft and the axis of rotation of the front wheel so that steering is made easy, and no road shocks are imparted to the steering wheel and also such steering arrangement enables turning in a very short radius.

A coupler 51, for receiving a mating coupler on a trailer truck is herein illustrated as being secured to the rear axle assembly by means of a bracket 52. The coupler 51 might if desired be secured to the frame and be as efficacious in service.

The frame, which is supported on the unit backbone is made of plate material 76 constituting side members and upstanding rear end 53, which serves a double purpose of a back for the driver's seat 54 and as a rear guard for the driver. The frame also carries a radiator 55, a hood 56 and an instrument board 57. In front of the radiator 55 is mounted a sheet metal guard 58 for protecting the radiator against damage in collision. The guard 58 is provided with suitable apertures so that air may pass therethrough and reach the radiator for cooling purposes.

A steering wheel 59 is disposed on the shaft 45 in convenient position to be engaged by an operator on the seat 54 and a gear shift lever 60 is provided for shifting the gears in the usual manner.

Disposed on a stub shaft 61 secured to the adjacent side plate 76 of the frame are the clutch and brake pedals, the clutch pedal 62 being illustrated in elevation.

The brakes on the driving wheel 11 are actuated by linkage indicated generally at 63 operable by the usual brake lever which is behind the clutch lever or pedal 62.

The rear end of the frame is supported on the backbone by springs, which are substantially flat semi-elliptical springs 64. The front ends of the springs 64 are secured to studs 65, welded to the adjacent side plates or aprons 15 of the frame structure, while the rear ends are connected by means of shackles 66 to stud 67 secured to the adjacent side plates of the frame. Central portions of the springs rest on spring pads 68 of the rear axle.

It will be observed that the unit construction just described provides a strong, sturdy tractor, which is close coupled and which is capable of turning on a short radius. These tractors are made with an overall length of slightly over six feet and with the minimum outside clearance of substantially 4½ feet. A tractor constructed in accordance with the present invention climbs a 20% grade with a three ton trailing load at the rate of 2.6 M. P. H. and with no load travels at a speed of 7½ to 8 M. P. H. Such a tractor has a sustained tractive effort of 2300 lbs. at 2.14 M. P. H.

The tires on the rear wheels 11 are zero pressure tires, that is, tires formed with interior hollow spaces while the tire on the front wheel 12 is a cushion tire.

The frame is of heavy welded steel plate and encloses all of the working parts and provides a smooth exterior. The unit assembly of engine, transmission and rear axle assembly is compact, readily accessible for maintenance and repair, and at the same time affords the shortest and simplest design of tractor.

The provision of semi-elliptic springs as described, front and rear, provides smooth spring suspension and, with the rubber mounting for the front end of the unit, protects the mechanism and permits operation on rough roadways. A tractor constructed in accordance with the present invention has a turning radius of 54½ inches, consequently, it may be seen that such tractor can be maneuvered in close or cramped spaces or quarters.

The rear axle assembly has top and bottom covers thus allowing easy access to the interior for maintenance and repair. The drive shaft is of semi-floating splined shaft construction and is driven by the pinion 9.

The transmission may be the usual three speed and reverse type of any suitable form.

The construction of the steering mechanism of the present invention enables the use of a ring gear for turning the single front wheel, and the plate fork construction enables the use of the ring gear mounting as a fifth wheel.

The invention has been described herein more or less precisely as to details yet it is to be understood that the invention is not to be limited thereby as changes may be made in the arrangement and proportion of parts, and equivalents may be substituted, without departing from the spirit and scope of the invention.

The invention is claimed as follows:

1. A tractor including a backbone comprising a unit construction consisting of an engine, transmission and rear axle assembly connected together for straight line drive; a front steering wheel structure; a horizontally disposed ring gear connected to said wheel structure for turning it; a mounting for said ring gear; said mounting carrying a substantially vertically disposed ring of compressible, resilient material such as rubber or rubber composition; a pivot member carried by the front of said backbone and entered in said ring and thereby supported for limited vertical and also rotative movement; the arrangement constituting a cushion support for the front end of said backbone and enabling swivel movement of the front wheel with respect to the backbone about said pivot member as a center.

2. In a gasoline tractor, in combination, an engine having a forwardly extending stud, a substantially horizontal member having an upstanding part to receive said stud, a plate supported by said member to rotate about a vertical axis, a yoke connected to said plate, semi-elliptic spring means operatively associated with portions of said yoke, an axle extending transversely of said yoke and connected to said spring means, a wheel on said axle, and steering means operatively associated with said plate for steering said wheel.

3. A front end construction for a tractor, including a stud secured to the front end of the engine and co-axial with the crankshaft thereof, means providing a socket for said stud, a member of which said means forms a part, a horizontally disposed plate supported from said member and adapted for rotation about a vertical axis, means for retaining said plate against said member to prevent vertical separation, yoke means secured to said plate, spring means connected to said yoke means, an axle connected to said spring means, a wheel on said axle, and means for rotating said plate to steer said wheel.

WILLIAM SCHROEDER.